US009670565B2

(12) United States Patent
Spence (10) Patent No.: US 9,670,565 B2
(45) Date of Patent: Jun. 6, 2017

(54) SYSTEMS AND METHODS FOR THE HYDROMETALLURGICAL RECOVERY OF LEAD FROM SPENT LEAD-ACID BATTERIES AND THE PREPARATION OF LEAD OXIDE FOR USE IN NEW LEAD-ACID BATTERIES

(71) Applicant: Johnson Controls Technology Company, Holland, MI (US)

(72) Inventor: Matthew A. Spence, Lindenhurst, IL (US)

(73) Assignee: Johnson Controls Technology Company, Holland, MI (US)

(*) Notice: Subject to any disclaimer, the term of this patent is extended or adjusted under 35 U.S.C. 154(b) by 210 days.

(21) Appl. No.: 14/586,111

(22) Filed: Dec. 30, 2014

(65) Prior Publication Data

US 2015/0368750 A1    Dec. 24, 2015

Related U.S. Application Data

(60) Provisional application No. 62/049,919, filed on Sep. 12, 2014, provisional application No. 62/015,045,
(Continued)

(51) Int. Cl.
| | | |
|---|---|---|
| C22B 13/00 | (2006.01) | |
| C22B 3/00 | (2006.01) | |
| C22B 7/00 | (2006.01) | |
| H01M 6/52 | (2006.01) | |
| H01M 10/54 | (2006.01) | |
| C22B 3/02 | (2006.01) | |
| C22B 3/16 | (2006.01) | |

(52) U.S. Cl.
CPC ............ *C22B 13/045* (2013.01); *C22B 3/02* (2013.01); *C22B 3/16* (2013.01); *C22B 7/007* (2013.01);
(Continued)

(58) Field of Classification Search
CPC .......... C22B 13/045; C22B 3/02; C22B 3/16; C22B 7/007; H01M 10/54; H01M 6/52
(Continued)

(56) References Cited

U.S. PATENT DOCUMENTS

| 3,620,670 A | 11/1971 | Bratt et al. |
| 4,118,219 A | 10/1978 | Elmore et al. |

(Continued)

FOREIGN PATENT DOCUMENTS

| CA | 2141906 A1 | 4/1996 |
| CA | 2319285 A1 | 3/2002 |

(Continued)

OTHER PUBLICATIONS

Kumar, Vasant R. et al., Relevance of Reaction of Lead Compounds with Carboxylic acid in Lead Recovery from Secondary Sources, Powder Metallurgy & Mining, Mar. 20, 2013, pp. 1-5, vol. 2, Issue 1.

(Continued)

*Primary Examiner* — Steven Bos
(74) *Attorney, Agent, or Firm* — Fletcher Yoder, P.C.

(57) ABSTRACT

The present disclosure relates generally to recycling lead-acid batteries, and more specifically, relates to purifying and recycling the lead content from lead-acid batteries. A lead recovery system includes a first reactor configured to receive and mix a lead-bearing material and a first carboxylate source to yield a first mixture, wherein the first mixture includes a first lead carboxylate that is dissolved in a liquid component of the first mixture. The system includes a second reactor configured to receive and mix the liquid component of the first mixture and a second carboxylate source to yield a second mixture, wherein the second mixture includes solid particles of a second lead carboxylate. The system includes a third reactor configured to receive and mix the solid particles of the second lead carboxylate and a hydroxide solution to yield a third mixture, wherein the third mixture includes solid particles of lead oxide.

6 Claims, 5 Drawing Sheets

Related U.S. Application Data filed on Jun. 20, 2014, provisional application No. 62/015,042, filed on Jun. 20, 2014, provisional application No. 62/015,058, filed on Jun. 20, 2014, provisional application No. 62/015,070, filed on Jun. 20, 2014.

(52) U.S. Cl.
CPC ............ *H01M 6/52* (2013.01); *H01M 10/54* (2013.01); *Y02P 10/234* (2015.11); *Y02W 30/84* (2015.05)

(58) Field of Classification Search
USPC .............................. 266/101; 429/49; 423/92
See application file for complete search history.

(56) References Cited

U.S. PATENT DOCUMENTS

| | | | |
|---|---|---|---|
| 4,220,628 | A | 9/1980 | Striffler, Jr. et al. |
| 4,269,811 | A | 5/1981 | Striffler, Jr. |
| 4,294,977 | A | 10/1981 | Schep |
| 4,336,236 | A | 6/1982 | Kolakowski et al. |
| 5,292,456 | A | 3/1994 | Francis et al. |
| 5,342,449 | A | 8/1994 | Holbein et al. |
| 5,429,661 | A | 7/1995 | Khodov et al. |
| 5,460,730 | A | 10/1995 | Czerny et al. |
| 5,514,263 | A | 5/1996 | Spijkerman et al. |
| 5,630,931 | A | 5/1997 | Manequini |
| 5,690,718 | A | 11/1997 | Sabin |
| 5,788,740 | A | 8/1998 | Chase |
| 5,827,347 | A | 10/1998 | Margulis |
| 5,840,262 | A | 11/1998 | Margulis |
| 5,879,830 | A | 3/1999 | Olper et al. |
| 5,944,869 | A | 8/1999 | Modica et al. |
| 6,110,433 | A | 8/2000 | Kleinsorgen et al. |
| 6,117,209 | A | 9/2000 | Adanuvor |
| 6,150,050 | A | 11/2000 | Mathew et al. |
| 6,471,743 | B1 | 10/2002 | Young et al. |
| 7,090,760 | B2 | 8/2006 | Seo et al. |
| 7,498,012 | B2 | 3/2009 | Olper et al. |
| 7,507,496 | B1 | 3/2009 | Kinsbursky et al. |
| 7,608,178 | B2 | 10/2009 | De Jonghe et al. |
| 7,713,502 | B2 | 5/2010 | Koehler et al. |
| 7,772,452 | B2 | 8/2010 | Modica |
| 7,799,294 | B2 | 9/2010 | Kordosky et al. |
| 7,833,646 | B2 | 11/2010 | Zenger et al. |
| 8,147,780 | B2 | 4/2012 | Martini |
| 8,323,376 | B2 | 12/2012 | Kumar et al. |
| 8,323,595 | B1 | 12/2012 | Smith et al. |
| 8,562,923 | B1 | 10/2013 | Smith et al. |
| 2006/0239903 | A1 | 10/2006 | Guerriero et al. |
| 2007/0028720 | A1 | 2/2007 | Sommariva et al. |
| 2010/0040938 | A1 | 2/2010 | Kumar et al. |
| 2010/0043600 | A1 | 2/2010 | Martini |
| 2010/0143219 | A1 | 6/2010 | Chow |
| 2011/0129410 | A1 | 6/2011 | Trindade |
| 2012/0186397 | A1 | 7/2012 | Martini |
| 2013/0064743 | A1 | 3/2013 | Laurin et al. |
| 2014/0023574 | A1 | 1/2014 | Smith et al. |
| 2014/0131219 | A1 | 5/2014 | Fassbender et al. |
| 2014/0166469 | A1 | 6/2014 | Ure |

FOREIGN PATENT DOCUMENTS

| | | |
|---|---|---|
| CN | 1357938 | 7/2002 |
| CN | 1451771 | 10/2003 |
| CN | 1470675 | 1/2004 |
| CN | 1601805 | 3/2005 |
| CN | 1812183 | 8/2006 |
| CN | 101104887 | 1/2008 |
| CN | 101104890 | 1/2008 |
| CN | 101205080 | 6/2008 |
| CN | 201071389 | 6/2008 |
| CN | 101250720 | 8/2008 |
| CN | 101291008 | 10/2008 |
| CN | 101318692 | 12/2008 |
| CN | 101345328 | 1/2009 |
| CN | 101414698 | 4/2009 |
| CN | 101488597 | 7/2009 |
| CN | 101514395 | 8/2009 |
| CN | 101540395 | 9/2009 |
| CN | 101608264 | 12/2009 |
| CN | 101613803 | 12/2009 |
| CN | 101615707 | 12/2009 |
| CN | 101748277 | 6/2010 |
| CN | 101759158 | 6/2010 |
| CN | 101771181 | 7/2010 |
| CN | 101792176 | 8/2010 |
| CN | 101831668 | 9/2010 |
| CN | 101899576 | 12/2010 |
| CN | 101994007 | 3/2011 |
| CN | 102020374 | 4/2011 |
| CN | 102020375 | 4/2011 |
| CN | 102031380 | 4/2011 |
| CN | 102162034 | 8/2011 |
| CN | 102306855 | 1/2012 |
| CN | 102306856 | 1/2012 |
| CN | 102351217 | 2/2012 |
| CN | 102396099 | 3/2012 |
| CN | 102427149 | 4/2012 |
| CN | 202285265 | 6/2012 |
| CN | 102560122 | 7/2012 |
| CN | 102560535 | 7/2012 |
| CN | 103050745 | 4/2013 |
| DE | 69905134 T2 | 10/2003 |
| EP | 0905810 A2 | 3/1999 |
| EP | 1656463 A1 | 5/2006 |
| EP | 1684369 A1 | 7/2006 |
| EP | 1728764 A1 | 12/2006 |
| EP | 2182569 A1 | 5/2010 |
| EP | 2312686 A1 | 4/2011 |
| EP | 2333895 A1 | 6/2011 |
| EP | 2450991 A1 | 5/2012 |
| EP | 2604711 A1 | 6/2013 |
| GB | 518236 | 2/1940 |
| JP | H10162868 | 6/1998 |
| RU | 2298044 C2 | 4/2007 |
| RU | 2302059 C1 | 6/2007 |
| TW | 391986 | 6/2000 |
| TW | 200937702 | 9/2009 |
| WO | WO0121846 A1 | 3/2001 |
| WO | WO03025235 A1 | 3/2003 |
| WO | WO2005007904 A1 | 1/2005 |
| WO | WO2008047956 A1 | 4/2008 |
| WO | 2008056125 A1 | 5/2008 |
| WO | 2008087684 A1 | 7/2008 |
| WO | 2011/013149 * | 2/2011 |
| WO | WO2011138996 A1 | 11/2011 |
| WO | 2014065888 A1 | 5/2014 |

OTHER PUBLICATIONS

PCT/US2015/035257 International Search Report and Witten Opinion dated Sep. 2, 2015.

Sonmez et al., "Leaching of waste battery paste components. Part 1: Lead citrate synthesis from PbO and PbO2", Abstract, May 3, 2008.

International Search Report and Written Opinion for PCT Application No. PCT/US2015/034758 mailed Dec. 23, 2015.

International Search Report and Written Opinion for PCT Application No. PCT/US2015/034694 mailed Dec. 23, 2015.

International Search Report and Written Opinion for PCT Application No. PCT/US2015/034761 mailed Dec. 23, 2015.

International Search Report and Written Opinion for PCT Application No. PCT/US2015/034717 mailed Dec. 23, 2015.

Zhu, Xinfeng; Leaching of Spent Lead Acid Battery Paste Components by Sodium Citrate and Acetic Acid; Journal of Hazardous Materials, Feb. 19, 2013; pp. 387-396.

* cited by examiner

SYSTEMS AND METHODS FOR THE HYDROMETALLURGICAL RECOVERY OF LEAD FROM SPENT LEAD-ACID BATTERIES AND THE PREPARATION OF LEAD OXIDE FOR USE IN NEW LEAD-ACID BATTERIES

CROSS-REFERENCE

This application claims priority from and the benefit of U.S. Provisional Application Ser. No. 62/049,919, entitled "HYDROMETALLURGICAL METHOD FOR SCRAP LEAD-ACID BATTERY RECYCLING", filed Sep. 12, 2014; U.S. Provisional Application Ser. No. 62/015,045, entitled "METHODS FOR PURIFYING AND RECYCLING LEAD FROM SPENT LEAD-ACID BATTERIES", filed Jun. 20, 2014; U.S. Provisional Application Ser. No. 62/015,042, entitled "SYSTEMS AND METHODS FOR PURIFYING AND RECYCLING LEAD FROM SPENT LEAD-ACID BATTERIES", filed Jun. 20, 2014; U.S. Provisional Application Ser. No. 62/015,058, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jun. 20, 2014; U.S. Provisional Application Ser. No. 62/015,070, entitled "SYSTEMS AND METHODS FOR SEPARATING A PARTICULATE PRODUCT FROM PARTICULATE WASTE WHEN RECYCLING LEAD FROM SPENT LEAD-ACID BATTERIES", filed Jun. 20, 2014, which are hereby incorporated by reference in their entireties for all purposes.

BACKGROUND

The present disclosure relates generally to systems and methods for recycling lead-acid batteries, and more specifically, relates to recycling the lead content from lead-acid batteries.

The lead present in a lead-acid battery may be in a number of forms. For example, a lead-acid battery may include grids, plates or spines of lead or lead alloys, battery paste that contains metallic lead sponge, lead oxides, and/or lead sulfates, and posts and/or interconnects that contain metallic lead and/or lead alloys. While it may be desirable to attempt to recover lead from the waste of spent or retired lead-acid batteries, this material may include a variety of lead compounds (e.g., lead alloys, oxides, sulfates and carbonates) and an array of physical and/or chemical impurities. Existing methods for purifying lead typically rely almost entirely on multi-stage pyrometallurgical smelting, in which some of these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process. For the construction of new lead acid batteries, the resulting refined lead should have purity in excess of 99% Pb. This highly refined lead is then converted to a mixture of lead and lead oxide as the first stage in producing the active material for new lead acid batteries.

SUMMARY

The present disclosure relates to systems and methods by which lead from spent lead-acid batteries may be extracted, purified, and used in the construction of new lead-acid batteries. In an embodiment, a lead recovery system includes a first reactor configured to receive and mix a lead-bearing material and a first carboxylate source to yield a first mixture, wherein the first mixture includes a first lead carboxylate that is dissolved in a liquid component of the first mixture. The system includes a second reactor configured to receive and mix the liquid component of the first mixture and a second carboxylate source to yield a second mixture, wherein the second mixture includes solid particles of a second lead carboxylate. The system includes a third reactor configured to receive and mix the solid particles of the second lead carboxylate and a hydroxide solution to yield a third mixture, wherein the third mixture includes solid particles of lead oxide.

In another embodiment, a method of producing lead oxide from a lead-bearing material includes leaching the lead-bearing material using a first carboxylate source to generate a leaching mixture that includes a dissolved first lead carboxylate and separating unleached solids from a liquid component of the leaching mixture. The method includes mixing the liquid component of the leaching mixture with a second carboxylate source to generate a carboxylate exchange mixture that includes solid particles of a second lead carboxylate and separating the solid particles of the second lead carboxylate from a liquid component of the carboxylate exchange mixture. The method includes mixing the solid particles of the second lead carboxylate with a hydroxide solution to generate a hydroxylation mixture that includes solid particles of lead oxide and separating the solid particles of lead oxide from a liquid component of the hydroxylation mixture.

In another embodiment, a lead recovery system includes an acetate leaching reactor configured to mix a lead-bearing material and an acetate source to yield a leaching mixture that includes dissolved lead acetate. The system includes a first phase separation device configured to separate unleached solids from a liquid component of the leaching mixture. The system includes a carboxylate exchange reactor configured to mix the liquid component of the leaching mixture and a citrate source to yield a carboxylate exchange mixture that includes solid lead citrate. The system includes a second phase separation device configured to separate the solid lead citrate from a liquid component of the carboxylate exchange mixture. The system also includes a hydroxylation reactor configured to mix the solid lead citrate and a hydroxide solution to yield a hydroxylation mixture that includes solid lead oxide. The system further includes a third phase separation device configured to separate the solid lead oxide from a liquid component of the hydroxylation mixture.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the unmodified term "lead", should be interpreted to encompass all forms of lead, including metallic lead, lead alloys, lead compounds, and mixtures thereof. For distinction, metallic lead (i.e., Pb(0)) may be referred to herein using the terms elemental lead, metallic lead, or free lead. As used herein, the term "substantially free" may be used to indicate that the identified component is not present at all, or is only present in a trace amount (e.g., less than 0.1%, less than 0.01%, or less than 0.001%). As used herein, a "carboxylate source" is any molecule or polymer that includes at least one carboxylate or carboxylic acid moiety or functionality. Accordingly, a non-limited list of example carboxylate sources include: citrate, acetate, formic acid, formate, lactate, dilactate, oxalate, tartarate, or any combination thereof. The term "citrate" or "citrate source" herein refers to citric acid or a citrate salt (e.g., sodium citrate or ammonium citrate). The term "acetate" or "acetate source" herein refers to acetic acid or acetate salts (e.g., sodium acetate, ammonium acetate). "New lead-acid battery" herein refers to a newly produced lead acid battery, while the term "spent lead-acid battery" indicates a battery at the end of its useable service life. As used herein "peroxide" refers to hydrogen peroxide and/or any organic peroxide (e.g. peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof. As used herein, an "antisolvent" is a solvent that may be added to a solution to facilitate the precipitation of a solute from a solution.

As mentioned above, existing methods typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion byproducts (e.g., $SO_2$, soot) may be restricted by local environmental regulations, present embodiments are directed toward enabling a solution-based removal of several impurities from the recovered lead, thereby avoiding or reducing the formation of such combustion byproducts and/or the cost associated with scrubbing them from the exhaust stream. The present disclosure enables the direct production of lead oxide, eliminating the need for dedicated oxide manufacturing from highly-refined pure lead, and thus reduces manufacturing cost of new lead acid batteries. The present disclosure enables the separation of metallic lead/alloys from leachable lead compounds, facilitating the retention of costly alloying agents that would otherwise be lost as drosses or slags.

As discussed in detail below, present embodiments address limitations of other waste lead purification techniques, enabling a robust technique for purifying and recycling of recovered lead on an industrial scale. In particular, present embodiments involve a hydrometallurgical recovery of lead from spent lead-acid batteries using a two-step process involving two different carboxylate sources: a first carboxylate source (e.g., an acetate) that forms a first lead salt that is sufficiently soluble in the leaching medium to enable separation of unleached solids, and a second carboxylate source (e.g., a citrate) that exchanges with the first carboxylate source to form an insoluble second lead salt that may be isolated after precipitation. Additionally, present embodiments facilitate the conversion of the isolated solid lead carboxylate into pure lead oxide having desirable physical properties for the manufacture of an active material (e.g., battery paste) for use in the construction of a new lead-acid battery. Further, present embodiments enable the recycling of various reagents (e.g., acetate, citrate, hydroxide, antisolvent) during the lead recovery and purification process, which reduces both waste production and operational costs. In addition, the process also enables the capture of byproducts as solids, reducing water treatment cost and yielding other potential products (i.e. sodium sulfate, ammonium sulfate).

Figure 1:
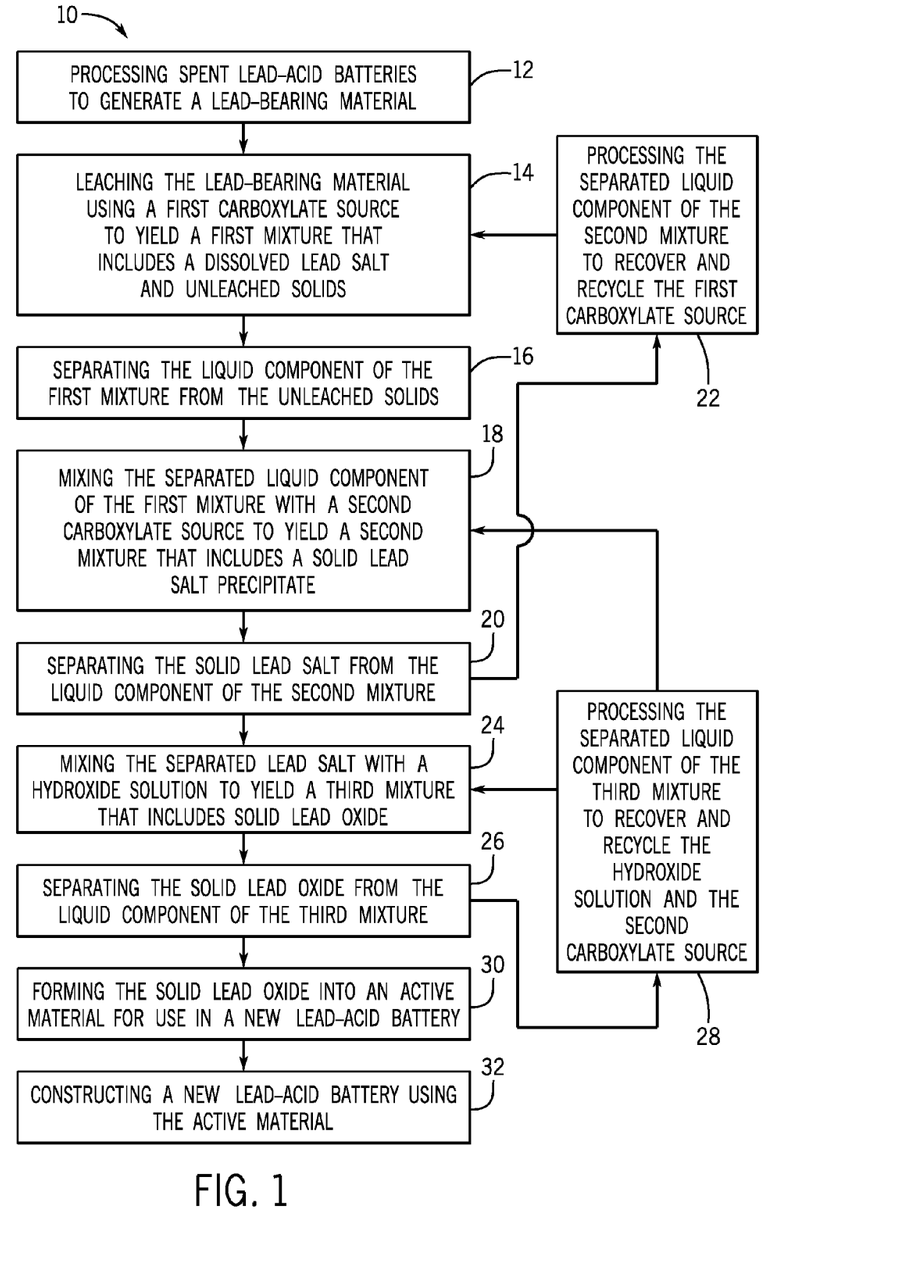
FIG. 1 is a flow diagram illustrating an embodiment of a process by which lead from spent lead-acid batteries may be extracted, purified, and used in the construction of new lead-acid batteries.

FIG. 1 is a flow diagram illustrating an embodiment of a process 10 by which lead from spent lead-acid batteries may be extracted, purified, and used in the construction of new lead-acid batteries. It may be appreciated that the process 10 of FIG. 1 is merely provided as an example and, in other embodiments, the process 10 may include additional purification steps (e.g., additional hydrometallurgical purification steps, additional phase-, size- or density-based separation steps, additional pH adjustment steps) in accordance with the present disclosure. As illustrated in FIG. 1, the process 10 begins with the processing (block 12) of spent lead-acid batteries to generate a lead-bearing material. For example, in an embodiment, one or more lead-acid batteries may be fed through a hammer mill or another suitable device that is capable of crushing, pulverizing, grinding or otherwise physically digesting the entirety of the spent lead-acid battery. The components of the spent lead-acid battery may include, for example, metal posts, metal connectors, metal grids, carbon black, glass, a plastic or metal casing, plastic separators, plastic fibers, lignosulphonates or other organic expanders, battery paste (e.g., including various lead oxides, lead carbonates, lead sulfates), sulfuric acid, among other components (e.g., non-lead-based metal components, such as brass terminals). The lead present in the spent lead acid battery may be in a number of different forms, including, for example, $PbO_2$, $PbO$, $PbSO_4$, $PbCO_3$, $Pb(0)$, and various lead alloys.

After being substantially pulverized, the resulting battery waste may, in certain embodiments, be passed through one or more preliminary purification steps in which certain components (e.g., the crushed plastic components) may be removed from the remainder of the lead-bearing mixture, for example, using a separation device (e.g., a settling tank or cyclone separator) that takes advantage of the lower density of these plastic components. For example, in certain embodiments, sieving may be applied as a separation step to separate massive metal particle fractions from other portions of the battery waste. Further, in certain embodiments, some, or all, of the residual sulfuric acid entrained in the lead-bearing material may be recycled for reuse, or neutralized and crystallized as a solid sulfate for disposal or resale. The recovered sulfuric acid may also serve functions in certain embodiments of the hydrometallurgical lead recovery process discussed below. In certain embodiments, pre-treatment of the lead-bearing material may include a full or partial desulfurization stage in which the sulfate content of the lead-bearing material may be reduced by chemical means, for example, by treatment with hydroxide (e.g., sodium hydroxide) or carbonate (e.g., soda ash). Each of these actions or steps may be generally represented by block 12.

The illustrated method 10 continues with leaching (block 14) the lead-bearing material generated in block 12 (which may include all of the battery waste, or a separated fraction thereof, as discussed above) using a first carboxylate source to yield a first mixture (e.g., a leaching mixture) that includes a dissolved lead carboxylate and unleached solids. In certain embodiments, the first carboxylate source may be an acetate or formate, or any other suitable carboxylate source that may drive the formation of lead salts that are generally soluble in the leaching mixture. Additionally, the pH of the leaching mixture may be increased (e.g., above 7 or more) using hydroxide to encourage leaching of the solid lead and dissolution of lead salts (e.g., lead acetate) in the leaching mixture. Furthermore, a reducing agent (e.g., peroxide, sodium metabisulfite, sulfur dioxide) may be added to the leaching mixture as well to facilitate the conversion of $PbO_2$ into a soluble $Pb^{2+}$ species. It is presently recognized that the ammonium ion (e.g., introduced into the leaching mixture as ammonium hydroxide or formed in situ from ammonia gas), is capable of forming lead complexes that further encourage the leaching of lead sulfates that may be present in the leaching mixture.

Subsequently, the liquid component of the leaching mixture may be separated (block 16) from unleached solids present in the mixture. The unleached solids may predominantly include residual metallic lead pieces from solid battery parts (e.g., terminals, connectors, grids), composed of a lead alloy that may include lead, antimony, arsenic, selenium, calcium, tin, silver, cadmium, or a combination thereof. Additionally, the unleached solid may, in certain embodiments, also include small residual particles (e.g., barium sulfate, carbon black, glass, polymer) from the processing of the battery in block 12. These unleached solids may be returned to the leaching vessel for further leaching or fed into other treatment systems (e.g., simple remelting or pyrometallurgical refining systems), in accordance with embodiments of the present disclosure. In certain embodiments, when the unleached solids are mostly or entirely metallic lead and lead alloys, the unleached solids may be remelted and used in the manufacture of a new lead-acid battery without further purification (e.g., smelting).

The liquid component of the leaching mixture isolated in block 16, which includes the dissolved lead salts (e.g., lead acetate) and various soluble impurities (e.g., ammonium sulfate, sodium sulfate), is subsequently mixed (block 18) with a second carboxylate source to yield a second mixture (e.g., a carboxylate exchange mixture) that includes a solid lead carboxylate precipitate. The second carboxylate source may be a citrate or another suitable carboxylate source capable of reacting with the dissolved lead salt (e.g., lead acetate) in the carboxylate exchange mixture to form a second lead salt (e.g., lead citrate) that has limited solubility in, and therefore precipitates from, the carboxylate exchange mixture. In certain embodiments, an acid (e.g., citric acid) may be added to lower the pH (e.g., below 7) to encourage precipitation of the lead salt (e.g., lead citrate) product from the carboxylate exchange mixture.

Subsequently, the solid lead salt precipitate may be separated (block 20) from the liquid component of the carboxylate exchange mixture. The liquid component may subsequently advance to a recovery system in which the liquid component is processed (block 22) to recover the first carboxylate source (e.g., acetate). As discussed in greater detail below, the processing of block 22 may involve, for example, various pH adjustments, phase separation steps, and distillation steps to recover the first carboxylate source. The recovered first carboxylate source may be fed back into the leaching step of block 14, as illustrated in FIG. 1, to enable recycling of the first carboxylate source for the illustrated process 10.

The solid lead salt (e.g., lead citrate) isolated in block 20 may subsequently be mixed (block 24) with a hydroxide solution (e.g., a 20-50 wt % solution of sodium hydroxide, ammonium hydroxide) to form a third mixture (e.g., a hydroxylation mixture) that includes a solid lead oxide. That is, when the lead salt (e.g., lead citrate) is mixed with the hydroxide solution, a hydroxylation reaction occurs that transforms the lead salt into tetragonal lead oxide. Since the lead oxide product has limited solubility, it may be separated (block 26) from the liquid component of the hydroxylation mixture. The conditions under which the hydroxylation reaction occurs may be controlled (e.g., addition rate) to obtain certain useful characteristics of the oxide produced (e.g., particle size).

The isolated liquid component of the hydroxylation mixture may advance to a recovery system in which the liquid component is processed (block 28) to recover the hydroxide solution and the second carboxylate source (e.g., citrate). As discussed in greater detail below, the processing of block 22 may involve, for example, the addition of an antisolvent, phase separation, and distillation to recover the hydroxide solution and the second carboxylate source. As illustrated in FIG. 1, the recovered second carboxylate source may be fed back into the carboxylate exchange step of block 18 and the recovered hydroxide solution may be fed back into the hydroxylation step of block 24, to enabling recycling of the hydroxide solution and the second carboxylate source for the illustrated process 10.

The illustrated process 10 continues with the lead oxide isolated in block 26 being formed (block 30) into a lead oxide active material for use in a new lead-acid battery. For example, the lead oxide isolated in block 26 may be water washed and subjected to a milling device in order to achieve particular lead oxide particle sizes, as discussed below. Milling of the lead oxide may be performed either wet or dry. Subsequently, the milled lead oxide produced may be mixed with water and sulfuric acid to form a battery paste that may be applied to a plurality of lead grids to serve as the active material of a new lead-acid battery. In this manner, a new lead-acid battery may be constructed (block 32) using the active material (e.g., lead oxide battery paste) formed in block 30.

Figure 2:
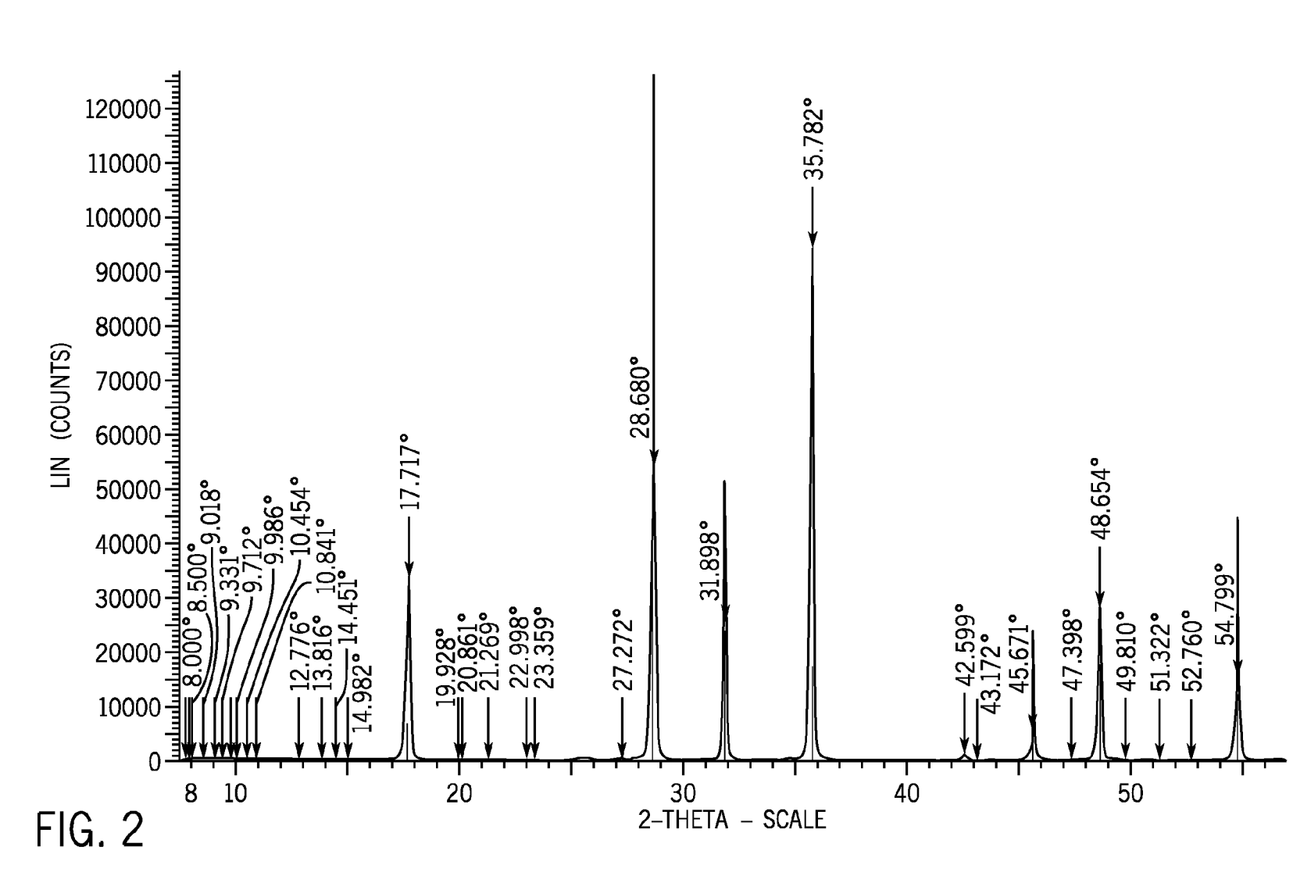
FIG. 2 is an X-ray diffraction (XRD) pattern of an embodiment of the tetragonal lead oxide product formed using the process of FIG. 1.

Using the disclosed process 10, the tetragonal lead oxide product has a number of physical properties that enable good performance for the new lead-acid battery constructed in block 32. For example, after the milling described above, the lead oxide particles may have an average particle size less than approximately 5 μm. More specifically, the lead oxide particles may have a $D_{50}$ (i.e., an indication of average diameter, a diameter that is greater than the diameters of 50% of the synthesized lead oxide particles) that is approximately 5 μm, wherein at least 99% of the particles have diameters less than 25 μm. Unlike the lead oxide produced by other methods, the lead oxide produced by the hydroxylation reaction of block 24 does not include free (metallic) lead. The lead oxide particles may have an acid absorption greater than approximately 200 mg $H_2SO_4$ per gram of lead oxide. Further, the lead oxide particles may be substantially or entirely of the tetragonal crystal form of lead oxide. FIG. 2 presents an X-ray diffraction pattern representative of the tetragonal lead oxide obtained by the process 10 illustrated in FIG. 1. As such, it may be appreciated that the physical and chemical properties of the lead oxide particles formed by the present approach enable the production of lead-acid batteries having good to excellent electrical performance.

Figure 3:
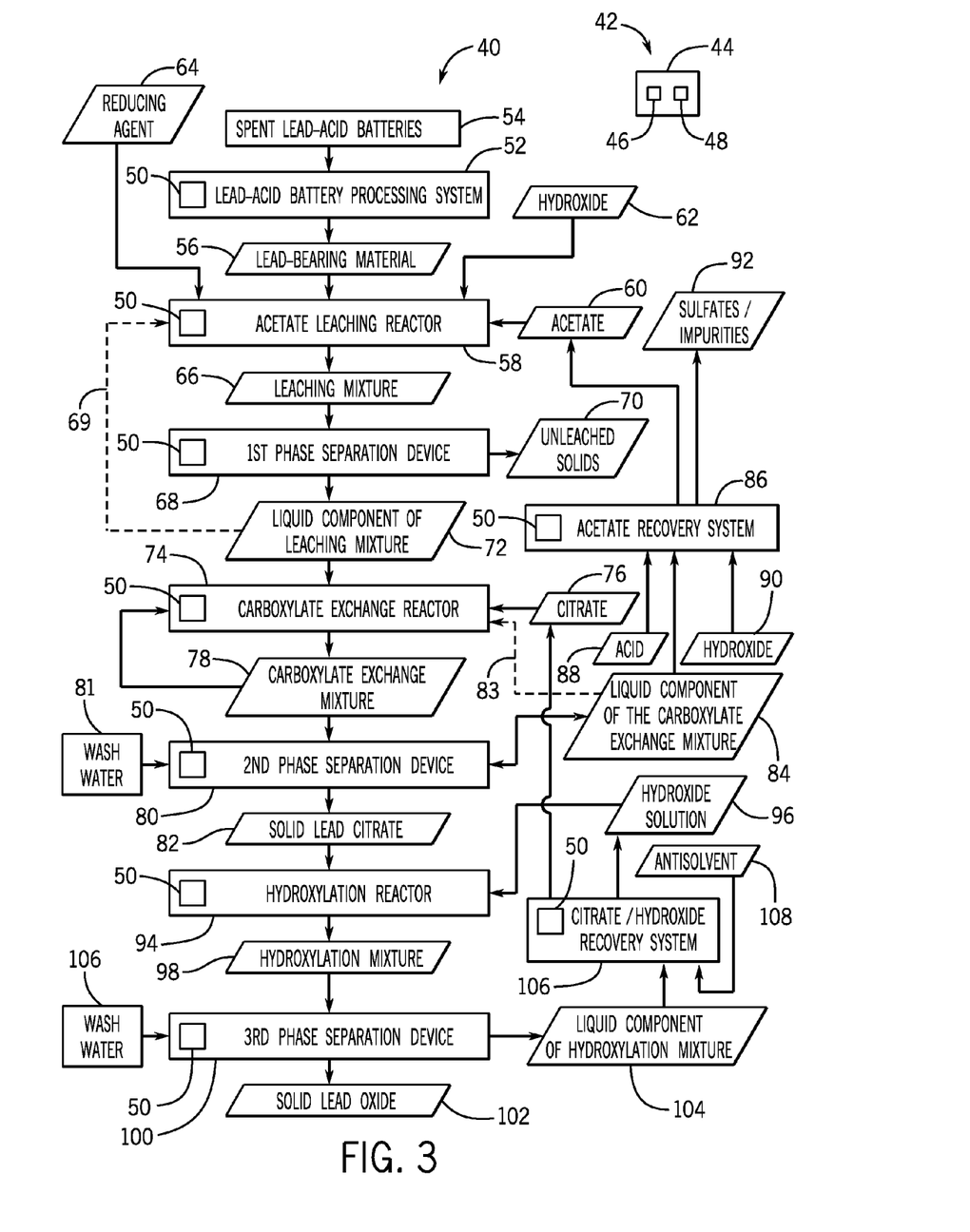
FIG. 3 is a schematic of an embodiment of a lead recovery system configured to perform the process of FIG. 1.

FIG. 3 illustrates an embodiment of a lead recovery system 40 configured to perform the process illustrated in FIG. 1 in what may be referred to as a continuous manner. In certain embodiments, some or all of the illustrated lead recovery system 40 may be implemented as a multi-stage reactor system, or a series of individual reactors, that include phase separation devices disposed between certain stages or reactors in the lead recovery system 40 to enable the continuous processing of spent lead-acid batteries into leady oxide. In addition to these devices, stages, and/or reactors (illustrated as rectangles) in the lead recovery system 40, FIG. 3 also illustrates the various inputs and outputs (illustrated as parallelograms) for each device in the lead recovery system 40.

Further, the illustrated lead recovery system 40 of FIG. 3 has a control system 42 that includes a controller 44 (e.g., a programmable logic controller (PLC)). The controller 44 includes a memory 46 and a processor 48, which enable the controller 44 to store and execute instructions (e.g., applications, modules, apps, firmware) to control operation of the lead recovery system 40. For example, the lead recovery system 40 may include any number of sensing field devices 50 (e.g., temperature sensors, pressure sensors, flow rate sensors, oxygen sensors, rotational speed sensors, pH sensors) that are disposed throughout the lead recovery system 40 and are communicatively coupled to the controller 44 (e.g., via a wired or wireless communication channel) to enable the controller 44 to determine the operational parameters of the lead recovery system 40. Further, the controller 44 may be communicatively coupled to one or more control field devices 50 (e.g., actuators, valves, motors, pumps, screws, heating elements, compressors) configured to receive control signals from the controller 44 and modulate their operation or state accordingly.

With the foregoing in mind, the lead recovery system 40 illustrated in FIG. 3 includes a lead-acid battery processing system 52 that receives spent lead-acid batteries 54 and generates a lead-bearing material 56. As such, the lead-acid battery processing system 52 performs the acts described by block 12 of the process 10 illustrated in FIG. 1. As mentioned above, the lead-acid battery processing system 52 illustrated in FIG. 3 may include a hammer mill or another suitable device that is capable of receiving partial or entire lead-acid batteries (e.g., via a feed chute) and grinding the lead-acid batteries into pulverized battery materials. Additionally, as mentioned above, the lead-acid battery processing system 52 may include some preliminary separation or purification features to remove one or more components from the pulverized battery materials. For example, in certain embodiments, the spent lead-acid battery processing system 52 may include a magnet, to remove iron and steel pieces, and/or a cyclone separation device may separate lower density spent battery components (e.g., plastic components from the housing of the lead-acid batteries) from the higher-density lead-bearing material 56, which may subsequently be advanced to the next device (e.g., acetate leaching reaction 58) in the illustrated lead recovery system 40.

For the embodiment of the lead recovery system 40 illustrated in FIG. 3, the acetate leaching reactor 58 may be a leaching reactor or leaching tank that performs the acts described by block 14 of the process 10 illustrated in FIG. 1. In addition to the lead-bearing material 56 received from the lead-acid battery processing system 52, the illustrated acetate leaching reactor 58 receives a supply of acetate 60, which serves as the first carboxylate source for the system 40. The illustrated acetate leaching reactor 58 also receives a feed of reducing agent 64 (e.g., peroxide, sodium metabisulfite, sulfur dioxide) to facilitate the conversion of $PbO_2$ into a soluble $Pb^{2+}$ species. The illustrated acetate leaching reactor 58 receives a supply of hydroxide 62 in order to maintain a high (basic) pH (e.g. pH greater than 7). Additionally, the illustrated acetate leaching reactor 58 is capable of heating the resulting leaching mixture 66 to provide temperatures ranging from approximately room temperature (e.g., 30° C.) up to the boiling point (e.g., 100° C.) of the leaching mixture 66. Further, in order to facilitate the leaching process, in certain embodiments, the rate at which the lead-bearing material 56, the hydroxide 62, the reducing agent 64, as well as other feeds (e.g., water), are added into the acetate leaching reactor 58 may be controlled by the controller 44 to maintain a solid-to-liquid ratio of approximately 1:5 to approximately 1:10 in the leaching mixture 66. That is, it is presently recognized that maintaining a solid-to-liquid ratio in this range improves the leaching of the lead-bearing material 56 by providing sufficient mobility and/or fluidity within the leaching mixture 66.

The lead recovery system 40 illustrated in FIG. 3 includes a first phase separation device 68 that is configured to perform the acts described in block 16 of the process 10 illustrated in FIG. 1. In certain embodiments, the first phase separation device 68 may include a filter press, a clarifier with or without precipitation means, a cyclone separator, a settling tank, a drying belt, a spray drier, a cyclonic separator, a settling tank, or any other device or combination of devices capable of separating components of the leaching mixture 66 based on particle size, solubility and/or density. As such, the first phase separation device 68 receives the leaching mixture 66 and separates the unleached solids 70 from the liquid component 72 of the received leaching mixture 66. As set forth above, these unleached solids 70 may include, for example, residual pieces of lead or lead alloys (e.g., grid metal), which may advance to other purification techniques or systems (e.g., re-melt or pyrometallurgical purification systems) in accordance with the present disclosure. The isolated liquid component 72, which includes dissolved lead acetate as well as other soluble impurities, may subsequently be advanced to the next device (e.g., carboxylate exchange reactor 74) in the illustrated lead recovery system 40. As illustrated by the dashed line 69, in certain embodiments, a portion of the liquid component 72 of the leaching mixture 66 may be recirculated back to the acetate leaching reactor 58 to facilitate further leaching of the lead-bearing material 56.

The lead recovery system 40 illustrated in FIG. 3 includes a carboxylate exchange reactor 74 that is configured to perform the acts described in block 18 of the process 10 illustrated in FIG. 1. As such, the carboxylate exchange reactor 74 illustrated in FIG. 3 is a reactor or vessel capable of receiving the separated liquid component 72 of the leaching mixture 66. The illustrated carboxylate exchange reactor 74 also receives and mixes in a citrate 76, which acts as the second carboxylate source for the lead recovery system 40, to yield the carboxylate exchange mixture 78 that includes solid lead citrate. Additionally, the illustrated carboxylate exchange reactor 74 is capable of heating the carboxylate exchange mixture 78 to provide temperatures ranging from approximately 20° C. to approximately 50° C. to facilitate the carboxylate exchange reaction and/or crystal growth. In certain embodiments, the citrate 76 may be a mixture of citric acid and sodium citrate, which may generally behave as a citrate buffer solution that maintains a low (acidic) pH (e.g., between approximately 3.4 and approximately 6.2) in the carboxylate exchange mixture 78. In certain embodiments, the pH of the carboxylate exchange mixture 78 may be controlled to provide either lead monocitrate (e.g., at relatively lower pH) or lead tricitrate (e.g., at relatively higher pH). In other embodiments, the lead citrate precipitate formed in the carboxylate exchange mixture 78 may be a mixture of lead monocitrate and lead tricitrate. As illustrated in FIG. 3, the carboxylate exchange mixture 78 may subsequently be advanced to the next device (e.g., second phase separation device 80) in the illustrated lead recovery system 40.

The lead recovery system 40 illustrated in FIG. 3 includes a second phase separation device 80 that is configured to perform the acts described in block 20 of the process 10 illustrated in FIG. 1. In certain embodiments, the second phase separation device 80 may include a filter press, a clarifier, a cyclone separator, drying belts, spray dryers, a settling tank, or any other device or combination of devices capable of separating components of the carboxylate exchange mixture 78 based on particle size, solubility and/or density. As such, the second phase separation device 80 receives the carboxylate exchange mixture 78 and separates the solid lead citrate 82 from a liquid component 84 of the received carboxylate exchange mixture 78.

As illustrated in FIG. 3, the second phase separation device 80 may receive a supply of wash water 81 to rinse the isolated solid lead citrate 82. In certain embodiments, the wash water 81 may have a particular temperature (e.g., 32° C.) in order to maximize the solubility of particular impurities (e.g., sodium sulfate) in the wash water 81. The liquid component 84 of the carboxylate mixture 78 isolated by the second phase separation device 80, which may include soluble sulfates (e.g., sodium sulfate, ammonium sulfate) and soluble acetates (e.g., sodium acetate, ammonium acetate), may then advance to the next device (e.g., an acetate recovery system 86) in the illustrated lead recovery system 40, as discussed below. As illustrated by the dashed line 83, in certain embodiments, a portion of the liquid component 84 of the carboxylate exchange mixture 78 may be recirculated back to the carboxylate exchange reactor 74 to facilitate further carboxylate (e.g., acetate-to-citrate) exchange. Additionally, the isolated solid lead citrate 82 may advance to the next device (e.g., hydroxylation reactor 94) in the illustrated lead recovery system 40, as discussed below.

In certain embodiments, the lead recovery system 40 may also include an acetate recovery system 86 that is configured to perform the acts described in block 22 of the process 10 illustrated in FIG. 1. The acetate recovery system 86 illustrated in FIG. 3 (and discussed in greater detail below with respect to FIG. 4) generally receives the liquid component 84 of the carboxylate exchange mixture 78 that is isolated by the second phase separation device 80 and performs a number of processing steps to recover a substantial portion (e.g., some, a majority, or all) of the acetate 60. These processing steps may include, for example, pH adjustments (e.g., using acid 88 and hydroxide 90), phase separation, distillation, or other suitable steps to separate the acetate 60 from the other constituents of the received liquid component 84. Accordingly, the acetate recovery system 86 is generally capable of recovering a substantial portion of the acetate 60 separately from sulfates/impurities 92 that are dissolved within the liquid component 84 of the carboxylate exchange mixture 78. As illustrated in FIG. 3, the recovered acetate 60 may subsequently be supplied back into the acetate leaching reactor 58 such that a substantial portion of the acetate 60 may be recycled within the lead recovery system 40.

The lead recovery system 40 illustrated in FIG. 3 also includes a hydroxylation reactor 94 that is configured to perform the acts described in block 24 of the process 10 illustrated in FIG. 1. As such, the hydroxylation reactor 94 illustrated in FIG. 3 receives the solid lead citrate 82 isolated by the second phase separation device 80 and mixes in a hydroxide solution 96 (e.g., a sodium hydroxide or ammonium hydroxide solution) to form a hydroxylation mixture 98. In the hydroxylation mixture 98, the solid lead citrate 82 undergoes a hydroxylation reaction and is converted into solid lead oxide (e.g., tetragonal $PbO_2$) that is dispersed in the hydroxylation mixture 98. It should be appreciated that the presently disclosed process is sufficiently robust that, even when the lead citrate precipitate is a mixture of monocitrate and tricitrate, a pure tetragonal lead oxide product may still be obtained after hydroxylation. In certain embodiments, the hydroxide solution 96 may be between approximately 20% and 50% approximately hydroxide by weight. The hydroxylation reactor 94 may be capable of providing temperatures ranging from approximately 25° C. to approximately 60° C. to facilitate the hydroxylation of the solid lead citrate 82. Additionally, the hydroxylation reactor 94 may be capable of agitating (e.g., mechanical stirring, mixing, bubbling) the hydroxylation mixture 98 to further facilitate the hydroxylation reaction.

The lead recovery system 40 illustrated in FIG. 3 also includes a third phase separation device 100 that is configured to perform the acts described in block 26 of the process 10 illustrated in FIG. 1. In certain embodiments, the third phase separation device 100 may include a filter press, a clarifier, a cyclone separator, drying belts, spray dryers, a settling tank, or any other device or combination of devices capable of separating components of the hydroxylation mixture 98 based on particle size, solubility and/or density. As such, the third phase separation device 100 illustrated in FIG. 3 receives the hydroxylation mixture 98 and separates the solid lead oxide 102 from the liquid component 104 of the hydroxylation mixture 98. As illustrated in FIG. 3, the third phase separation device 100 may receive a supply of water 106 to rinse the isolated solid lead oxide 102 to prevent residual hydroxide present within the hydroxylation mixture 98 from being collected along with the solid lead oxide 102. The liquid component 104 of the hydroxylation mixture 98 isolated by the third phase separation device 100, which may include dissolved hydroxide (e.g., sodium hydroxide, ammonium hydroxide) and dissolved citrate (e.g., sodium citrate, ammonium citrate), may then advance to the next device (e.g., an citrate/hydroxide recovery system 106) in the illustrated lead recovery system 40, as discussed below. Additionally, the isolated solid lead oxide 102 may be dried (e.g., using a belt drier or spray drier), wet milled or dry milled, and formed into an active material (e.g., battery paste) for use in the manufacture of a new lead-acid battery, as discussed in blocks 30 and 32 of the process 10 illustrated in FIG. 1.

In certain embodiments, the lead recovery system 40 may include a citrate/hydroxide recovery system 106 that is configured to perform the acts described in block 28 of the process 10 illustrated in FIG. 1. The citrate/hydroxide recovery system 106 illustrated in FIG. 3 (and discussed in greater detail below with respect to FIG. 5) generally receives the liquid component 104 of the hydroxylation mixture 98 from the third phase separation device 100, and may perform a number of processing steps to separately recover a substantial portion (e.g., some, a majority, all) of the hydroxide solution 96 and a substantial portion (e.g., some, a majority, all) of the citrate 76 from the liquid component 104. For example, these processing steps may include the addition of an antisolvent 108 (e.g., methanol), phase separation, solvent extraction, distillation, or other suitable processing steps. As illustrated in FIG. 3, the recovered citrate 76 may subsequently be fed back into the carboxylate exchange reactor 74, and the hydroxide solution 96 may subsequently be fed back into the hydroxylation reactor 94, such that a substantial portion of the citrate 76 and the hydroxide solution 96 may be recycled within the lead recovery system 40. It may be noted that, since the hydroxide is consumed in the hydroxylation reaction, the composition of the recycled hydroxide solution 96 will be made up to working strength (e.g., between 20 wt % and 50 wt %) by addition of a solid or more concentrated liquid feed.

Figure 4:
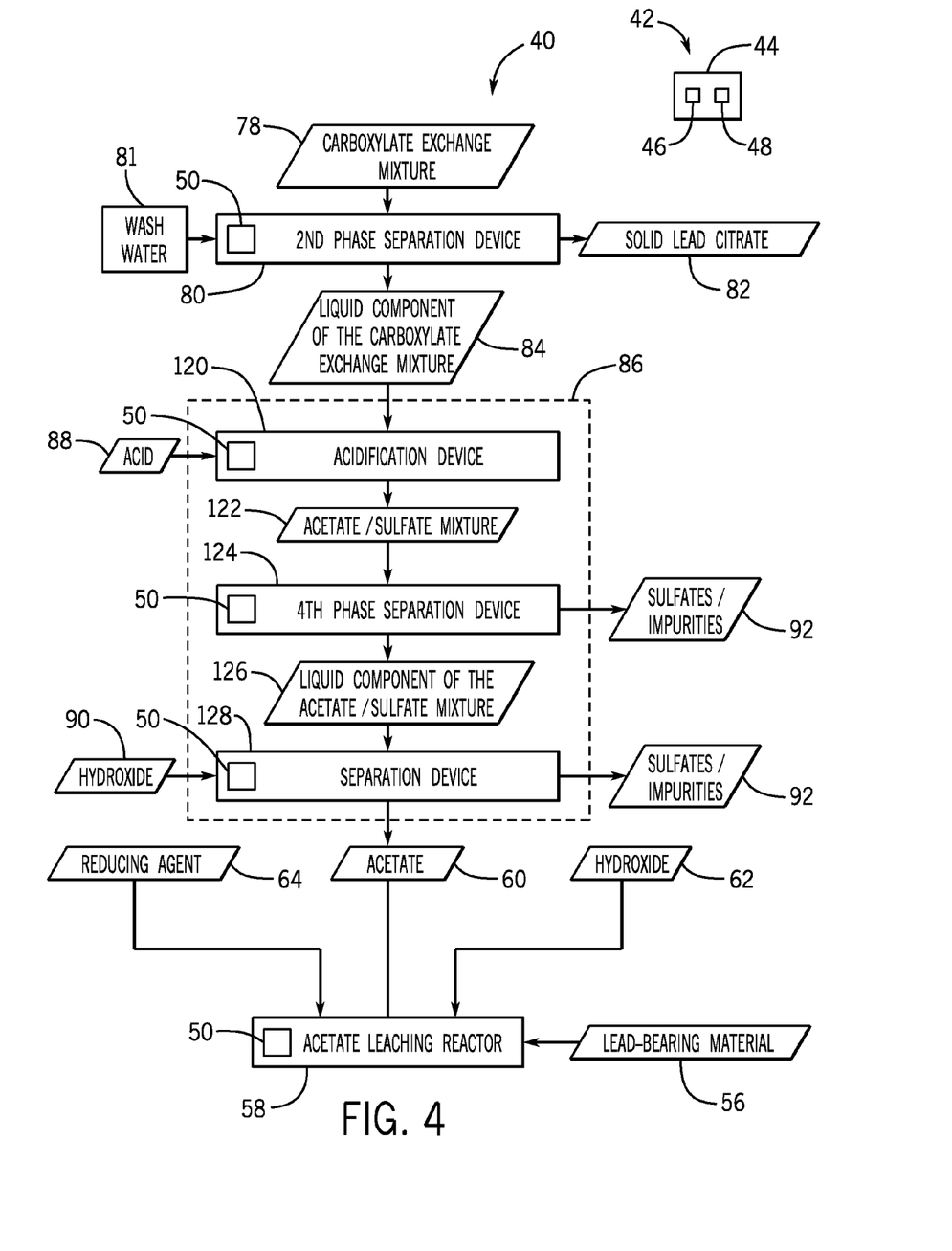
FIG. 4 is a schematic illustrating a portion of the lead recovery system of FIG. 3 that includes an embodiment of an acetate recovery system.

FIG. 4 illustrates a portion of the embodiment of the lead recovery system 40 illustrated in FIG. 3, and specifically illustrates an embodiment of the acetate recovery system 86 introduced above. As illustrated in FIG. 4, the second phase separation device 80 receives and separates the liquid component 84 of the carboxylate exchange mixture 78 from the solid lead citrate 82, which proceeds to hydroxylation, as discussed above. As also mentioned above, the acetate recovery system 86 performs a number of processing steps to recover a substantial portion (e.g., some, a majority, or all) of the acetate 60 that is present in the liquid component 84. For the embodiment of the acetate recovery system 86 illustrated in FIG. 4, these processing steps are illustrated as being performed by separate devices. As with the devices and systems discussed with respect to FIG. 3, the various devices that comprise the embodiment of the acetate recovery system 86 illustrated in FIG. 4 may include one or more monitoring and/or controlling field devices 50 that enable the controller 44 to monitor and control the operation of each device, as well as the system 40 as a whole.

The embodiment of the acetate recovery system 86 illustrated in FIG. 4 includes an acidification device 120 that receives the liquid component 84 of the carboxylate exchange mixture 78 from the second phase separation device 80. The acidification device 120 also receives a supply of acid 88, which is added to the liquid component 84 to yield an acetate/sulfate mixture 122 having a low pH (e.g., less than 2). In certain embodiments, the acid 88 may be sulfuric acid recovered from spent lead-acid batteries by the lead-acid battery processing system 52, discussed above with respect to FIG. 3. The pH reduction provided by the acid 88 causes a portion of the sulfates dissolved in the liquid component 84 to fall out of solution, such that the acetate/sulfate mixture 122 includes solid sulfate impurities as well as soluble acetates. The acetate/sulfate mixture 122 may then proceed to the next device (e.g., the fourth phase separation device 124), as illustrated in FIG. 4.

The acetate recovery system 86, as illustrated in FIG. 4, includes a fourth phase separation device 124. In certain embodiments, the fourth phase separation device 124 may include a filter press, a clarifier, a cyclone separator, drying belts, spray dryers, a settling tank, or any other device or combination of devices capable of separating components of the acetate/sulfate mixture 122 based on particle size, solubility and/or density. As such, the fourth phase separation device 124 illustrated in FIG. 4 receives the acetate/sulfate mixture 122 from the acidification device 120 and separates the liquid component 126 from of the solid sulfate impurities 92. The isolated solid sulfate impurities 92 may proceed to other purification techniques in accordance with the present disclosure. Additionally, the liquid component 126 of the acetate/sulfate mixture 122 may proceed to the next device (e.g., the separation device 128), as illustrated in FIG. 4.

The acetate recovery system 86 illustrated in FIG. 4 also includes a separation device 128 (e.g., distillation or selective membrane) that receives the liquid component 126 of the acetate/sulfate mixture 122. In certain embodiments, the separation device 128 may receive a supply of hydroxide 90 to neutralize any excess acid 88 introduced to the acetate/sulfate mixture 122 by the acidification device 120. From the received liquid component 126, the separation device 128 may separate out acetate 60 as a mixture of acetic acid and water. This recovered acetate 60 may be fed back into the acetate leaching reactor 58 such that the lead recovery system 40 recycles a substantial portion of the acetate 60 used in the lead recovery process. In certain embodiments, the separation device 50 may perform the separation elevated temperature and/or at reduced pressure. After the acetate 60 has been separated, the remaining portion of the liquid component 126 includes impurities 92 (e.g., sulfates and/or other impurities) that may advance to other purification systems, in accordance with the present disclosure.

Figure 5:
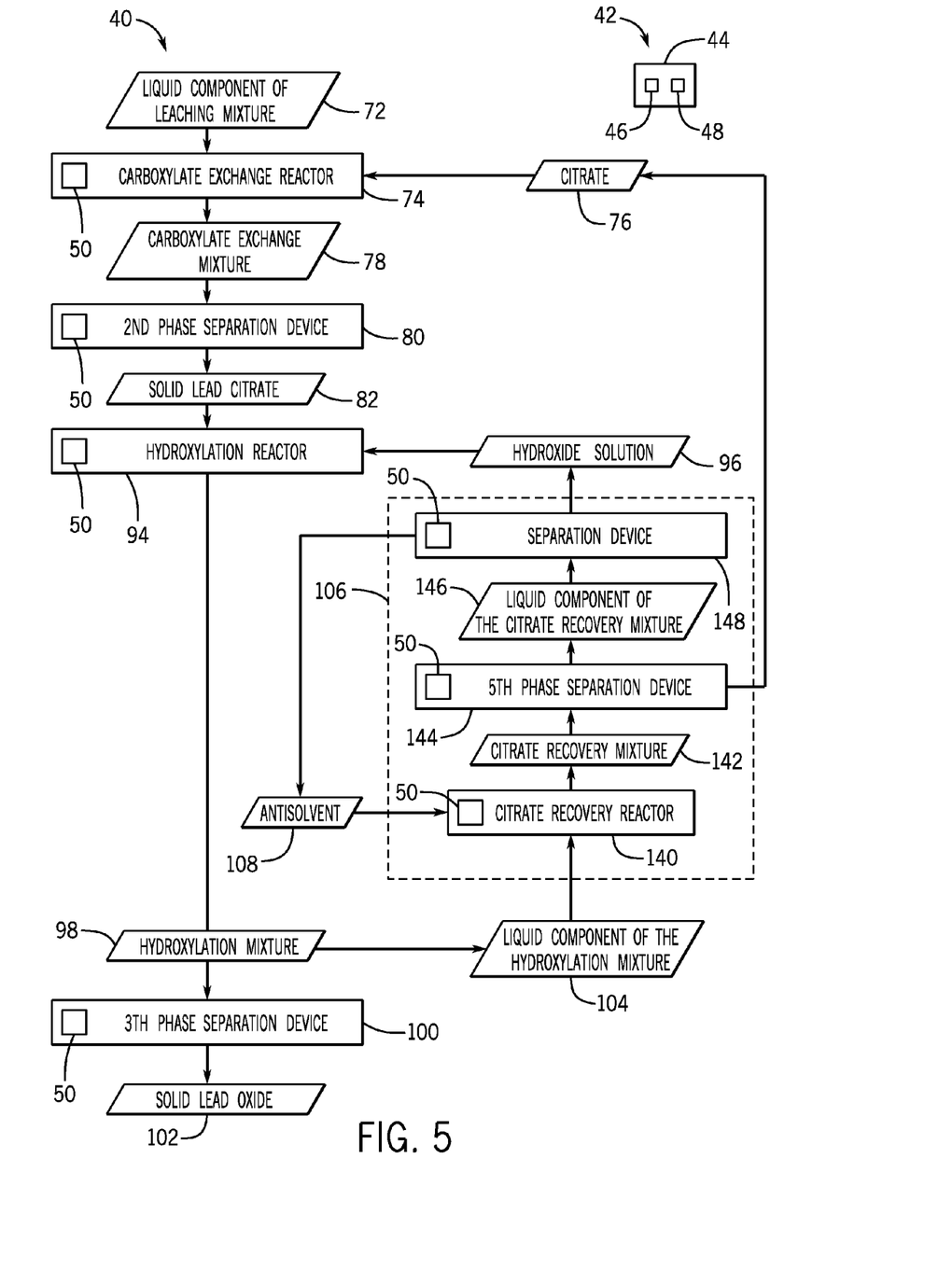
FIG. 5 is a schematic illustrating a portion of the lead recovery system of FIG. 3 that includes an embodiment of a citrate/hydroxide recovery system.

FIG. 5 illustrates a portion of the embodiment of the lead recovery system 40 illustrated in FIG. 3, and specifically illustrates an embodiment of the citrate/hydroxide recovery system 106 mentioned above. As illustrated in FIG. 5, the third phase separation device 100 receives and separates the liquid component 104 of the hydroxylation mixture 98 from the solid lead oxide product 102, as discussed above. As also mentioned above, the citrate/hydroxide recovery system 106 performs a number of processing steps to recover a substantial portion (e.g., some, a majority, or all) of the citrate 76 and the hydroxide solution 96 present within the received liquid component 104. For the embodiment of the citrate/hydroxide recovery system 106 illustrated in FIG. 5, these processing steps are illustrated as being performed by separate devices. As with the devices and systems discussed with respect to FIG. 3, the various devices that comprise the citrate/hydroxide recovery system 106 illustrated in FIG. 5 may include one or more monitoring and/or controlling field devices 50 that enable the controller 44 to monitor and control the operation of each device, as well as the system 40 as a whole.

The citrate/hydroxide recovery system 106 illustrated in FIG. 5 includes a citrate recovery reactor 140 that receives the liquid component 104 of the hydroxylation mixture 98 isolated by the third phase separation device 100. The citrate recovery reactor 104 also receives a supply of antisolvent 108 (e.g., methanol) that is added to the received liquid component 104 to yield a citrate recovery mixture 142. In general, the antisolvent 108 may be any miscible solvent that may be added to the received liquid component 104 to reduce the solubility of citrate dissolved in the liquid component 104. The citrate recovery mixture 142 generated by the citrate recovery reactor 140 may include antisolvent 108, dissolved hydroxide (e.g., sodium hydroxide), and solid citrate (e.g., sodium citrate). The citrate recovery mixture 142 may then proceed to the next device (e.g., the fifth phase separation device 144), as illustrated in FIG. 5. In certain embodiments, the addition of the antisolvent 108 to the liquid component 104 may also cause as any remaining dissolved lead (e.g., lead oxide, lead citrate) to also precipitate out of solution, and this lead may be recycled along with the citrate back into the carboxylate exchange reactor 74.

The citrate/hydroxide recovery system 106 illustrated in FIG. 5 also includes a fifth phase separation device 144. In certain embodiments, the fifth phase separation device 144 may include a filter press, a clarifier, a cyclone separator, drying belts, spray dryers, a settling tank, or any other device or combination of devices capable of separating components of the citrate recovery mixture 142 based on particle size, solubility and/or density. As such, the fifth phase separation device 144 receives the citrate recovery mixture 142 from the citrate recovery reactor 140 and separates the liquid component 146 of the citrate recovery mixture 142 from the insoluble citrate 76. The liquid component 146 of the citrate recovery mixture 142 may then proceed to the next device (e.g., separation device 148), as illustrated in FIG. 5. The recovered citrate 76 may be fed back into the carboxylate exchange reactor 74 such that a substantial portion (e.g., some, a majority, or all) of the citrate 76 is recycled by the lead recovery system 40.

The citrate/hydroxide recovery system 106 illustrated in FIG. 5 also includes a separation device 148 that receives the liquid component 146 of the citrate recovery mixture 142, which includes hydroxide solution 96 and antisolvent 108. From the received liquid component 146, the separation device 148 may separate (e.g., using distillation or a selective membrane) the antisolvent 108 away from the hydroxide solution 96. In certain embodiments, the separation device 148 may perform the separation at elevated temperature and/or under reduced pressure. As illustrated in FIG. 5, in certain embodiments, the recovered antisolvent 108 may be fed back into the citrate recovery reactor 140 such that a substantial portion (e.g. some, a majority, or all) of the antisolvent 108 may be recycled within the lead recovery system 40. Additionally, as illustrated in FIG. 5, in certain embodiments, the recovered hydroxide solution 96 may be fed back into the hydroxylation reactor 94 such that a substantial portion (e.g., some, a majority, or all) of the hydroxide solution 96 may be recycled within the lead recovery system 40.

One or more of the disclosed embodiments, alone or in combination, may provide one or more technical effects useful in the recovery of lead from spent lead-acid batteries. Embodiments of the present approach enable the industrial scale extraction and purification of lead from spent lead-acid batteries. Further, present embodiments enable the removal of several impurities (e.g., insoluble impurities, sulfates, alloying metals, trace contaminants) from the recovered lead, thereby avoiding or reducing the formation of certain undesired combustion byproducts as well as the cost associated with scrubbing these byproducts from the exhaust stream. The present disclosure provides a direct route from lead scrap to a useful lead oxide, avoiding the costly refinement and oxide manufacturing process. Accordingly, present embodiments enable continuous lead purification techniques that are robust to the presence of a wide variety of impurities and provide enhanced control over the parameters of the purification process. Additionally, present embodiments facilitate the conversion of the isolated lead carboxylate (e.g., lead citrate) into pure tetragonal lead oxide having desirable physical properties for the manufacture of an active material (e.g., battery paste) for use in the construction of new lead-acid batteries. Further, present embodiments enable the recycling of various reagents (e.g., carboxylate sources, hydroxide, antisolvent) during portions the lead recovery and purification process, which reduces both waste production and operational costs. The technical effects and technical problems in the specification are exemplary and are not limiting. It should be noted that the embodiments described in the specification may have other technical effects and can solve other technical problems.

While only certain features and embodiments of the disclosure have been specifically illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of producing lead oxide from a lead-bearing material, comprising:
   leaching the lead-bearing material with a first carboxylate source to generate a leaching mixture that includes a dissolved first lead carboxylate;
   separating unleached solids from a liquid component of the leaching mixture;
   mixing the liquid component of the leaching mixture with a second carboxylate source to generate a carboxylate exchange mixture that includes solid particles of a second lead carboxylate and the first carboxylate source;
   separating the solid particles of the second lead carboxylate from a liquid component of the carboxylate exchange mixture;
   mixing the separated solid particles of the second lead carboxylate with a hydroxide solution to generate a hydroxylation mixture that includes solid particles of lead oxide; and
   separating the solid particles of lead oxide from a liquid component of the hydroxylation mixture.

2. The method of claim 1, wherein the first carboxylate source comprises an acetate and the second carboxylate source comprises a citrate.

3. The method of claim 1, wherein the separated solid particles of lead oxide consist of tetragonal lead oxide.

4. The method of claim 1, comprising:
mixing the liquid component of the carboxylate exchange mixture with an acid to yield an acetate/sulfate mixture that includes a liquid component having the first carboxylate source and insoluble impurities;
separating the insoluble impurities from the liquid component of the acetate/sulfate mixture;
separating the first carboxylate source from the liquid component of the acetate/sulfate mixture; and
recycling the separated first carboxylate source to generate the leaching mixture.

5. The method of claim 4, wherein mixing the liquid component of the carboxylate exchange mixture with the acid comprises mixing the liquid component of the carboxylate exchange mixture with sulfuric acid recovered from a spent lead-acid battery.

6. The method of claim 1, comprising:
mixing the liquid component of the hydroxylation mixture with an antisolvent to yield a recovery mixture that includes solid particles of the second carboxylate source;
separating the solid particles of the second carboxylate source from a liquid component of the recovery mixture;
recycling the solid particles of the second carboxylate source to generate the carboxylate exchange mixture;
separating the liquid component of the recovery mixture to separately recover the antisolvent and the hydroxide solution;
recycling the recovered antisolvent to generate the recovery mixture; and
recycling the recovered hydroxide solution to generate the hydroxylation mixture.

\* \* \* \* \*

UNITED STATES PATENT AND TRADEMARK OFFICE
CERTIFICATE OF CORRECTION

PATENT NO. : 9,670,565 B2
APPLICATION NO. : 14/586111
DATED : June 6, 2017
INVENTOR(S) : Matthew A. Spence Page 1 of 1

It is certified that error appears in the above-identified patent and that said Letters Patent is hereby corrected as shown below:

In the Drawings

1. In Fig. 5, Sheet 5 of 5, for Tag "100", in Line 1, delete "3TH" and insert -- 3RD --, therefor.

In the Specification

2. In Column 2, Line 54, delete "DRAWINGS" and insert -- BRIEF DESCRIPTION OF THE DRAWINGS --, therefor.

3. In Column 3, Line 35, delete "tartarate," and insert -- tartrate, --, therefor.

4. In Column 9, Line 48, delete "carboxylate mixture 78" and insert -- carboxylate exchange mixture 78 --, therefor.

5. In Column 12, Line 32, delete "separation device 50" and insert -- separation device 128 --, therefor.

6. In Column 12, Line 63, delete "reactor 104" and insert -- reactor 140 --, therefor.

Signed and Sealed this
Sixth Day of November, 2018

Andrei Iancu
*Director of the United States Patent and Trademark Office*